United States Patent
Chen

(10) Patent No.: US 8,721,174 B2
(45) Date of Patent: May 13, 2014

(54) TEMPERATURE SENSING SYSTEM FOR SUPPORTING SINGLE-POINT CALIBRATION

(75) Inventor: Po-ki Chen, Taipei (TW)

(73) Assignee: National Taiwan University of Science and Technology, Taipei (TW)

(*) Notice: Subject to any disclaimer, the term of this patent is extended or adjusted under 35 U.S.C. 154(b) by 0 days.

(21) Appl. No.: 13/292,063

(22) Filed: Nov. 8, 2011

(65) Prior Publication Data

US 2012/0307866 A1   Dec. 6, 2012

(30) Foreign Application Priority Data

Jun. 3, 2011   (TW) .............................. 100119610 A

(51) Int. Cl.
*G01K 15/00* (2006.01)
*G01K 11/00* (2006.01)

(52) U.S. Cl.
USPC ............................................. 374/170; 374/1

(58) Field of Classification Search
USPC ............ 374/170, 171, 178, 1; 377/25; 331/66
See application file for complete search history.

(56) References Cited

U.S. PATENT DOCUMENTS

| | | | |
|---|---|---|---|
| 6,874,933 B1 * | 4/2005 | Chan | 374/171 |
| 2009/0141770 A1 * | 6/2009 | Chen et al. | 374/170 |

FOREIGN PATENT DOCUMENTS

| | | |
|---|---|---|
| EP | 1236026 B1 | 1/2006 |
| EP | 1475885 B9 | 8/2008 |
| TW | 200726965 | 7/2007 |
| TW | 200819716 | 5/2008 |
| TW | I294029 | 5/2008 |

OTHER PUBLICATIONS

IEEE ISSCC Dig., Feb. 2009, pp. 68-69.

* cited by examiner

*Primary Examiner* — Lisa Caputo
*Assistant Examiner* — Brandi N Hopkins
(74) *Attorney, Agent, or Firm* — CKC & Partners Co., Ltd.

(57) ABSTRACT

A time-domain temperature sensing system for supporting a single-point calibration is disclosed. Under a single calibration temperature, the digital output of the temperature sensing system is adjusted by a calibration circuit to a specific value, and the generated calibration parameter thereof can be stored in the same chip of the temperature sensing system or in an off-chip component such as a non-volatile memory. Accordingly, the drawback which is caused by the high cost of a conventional two-point calibration in prior art is solved.

9 Claims, 6 Drawing Sheets

TEMPERATURE SENSING SYSTEM FOR SUPPORTING SINGLE-POINT CALIBRATION

CROSS-REFERENCE

This application claims the priority of Taiwan Patent Application No. 100119610, filed on Jun. 3, 2011. This invention is partly disclosed in a paper "IEEE TRANSACTIONS ON CIRCUITS AND SYSTEMS—I: REGULAR PAPERS, VOL. 58, NO. 6, June 2011", entitled "All-Digital Time-Domain Smart Temperature Sensor With an Inter-Batch Inaccuracy of −0.7° C.-+0.6° C. After One-Point Calibration" completed by Poki Chen, Shou-Chih Chen, You-Sheng Shen, and You-Jyun Peng.

TECHNICAL FIELD OF THE INVENTION

The present invention relates to a temperature sensing system, especially to a time-domain smart temperature sensing system for supporting a single-point calibration.

BACKGROUND OF THE INVENTION

Traditionally, a temperature sensor converts a temperature under test into a voltage or current signal, and then the signal is converted into a digital output through a analog-to-digital converter (ADC) thereof. In order to achieve better accuracy and resolution, it usually requires a bulky ADC which consumes high power and large chip size.

Moreover, with the scaling down of manufacturing processes as well as the decrease of operating voltage, high accuracy ADC becomes more and more difficult to design. Therefore such temperature sensor will become increasingly hard to manufacture.

Accordingly, a Taiwan Patent No. 1294029 proposes a time-domain smart temperature sensor, which converts a temperature under test into a clock signal, in which the period of the clock signal varies as the test temperature changes, and then the signal is converted into a digital output through a time-to-digital converter. Because the structure thereof is simple, the chip area and power consumption can be effectively reduced. The temperature sensor can also be modified to be full digital and can be even realized in a Field Programmable Gate Array (FPGA).

However, due to process variation, the digital outputs of said temperature sensors are usually different and a calibration has to be performed before each temperature sensor being used. Generally, a two-point calibration is used in the time-domain smart temperature sensor, and said two-point calibration is to measure two corresponding output values at two different calibration temperatures and then to calculate a first-order approximation line according to said two output values. Therefore, the digital output measured from each temperature sensor needs to apply its own approximation line, so as to be converted to an actual test temperature. For the above reasons, the conventional temperature sensor using two-point calibration needs to be calibrated at two different temperatures. Comparing to single-point calibration, the calibration cost is effectively doubled. Moreover, such conventional temperature sensor requires more memory to store the calibration data. It makes said temperature sensor less competitive in the market.

Although a recent paper "IEEE ISSCC Dig., February 2009, pp. 68-69" disclosed a time-domain smart temperature sensor for supporting a single-point calibration, it requires a complex dual delay-locked loop which makes not only the chip area larger but also the accuracy poorer.

Accordingly, there is an urgent need to improve the conventional technology to overcome the drawback in the prior art.

SUMMARY OF THE INVENTION

An objective of the present invention is to provide a temperature sensing system for supporting a single-point calibration, which the system has a calibration circuit to perform the single-point calibration. The calibration result can be stored in on-chip or off-chip component, thereby solving the drawback of the conventional two-point calibration.

To achieve the foregoing objectives, according to an aspect of the present invention, the temperature sensing system for supporting a single-point calibration provided by the present invention includes a temperature-sensitive pulse generator, a time-to-digital converter, and a calibration circuit. The temperature-sensitive pulse generator is utilized to generate a mask clock signal, and the mask width of the mask clock signal varies as the test temperature changes. The temperature-sensitive pulse generator adjusts the mask width according to a calibration parameter. The time-to-digital converter is electrically coupled to the temperature-sensitive pulse generator for receiving the mask clock signal and converting the mask width into a digital output. The calibration circuit is electrically coupled to the temperature-sensitive pulse generator and the time-to-digital converter. The calibration circuit is used for making a comparison between the digital output of the time-to-digital converter and a predetermined calibration value under a specific calibration temperature to generate the calibration parameter provided for the temperature-sensitive pulse generator according to the comparison result.

In one preferred embodiment, the calibration circuit comprises a comparator and a successive approximation register (SAR) controller. The comparator is used for comparing the digital output with the predetermined calibration value to generate the comparison result. The SAR controller is electrically coupled to the comparator and the temperature-sensitive pulse generator, in which the SAR controller receives the comparison result to generate the calibration parameter. Specifically, when the digital output is larger than the predetermined calibration value, the SAR controller successively reduces the value of said calibration parameter. Accordingly, the calibration parameter is provided to the temperature-sensitive pulse generator for reducing the mask width. Similarly, when the digital output is less than the predetermined calibration value, the SAR controller successively increases the value of said calibration parameter. Accordingly, the calibration parameter is provided to the temperature-sensitive pulse generator for increasing the mask width.

In this preferred embodiment, the temperature-sensitive pulse generator includes a digital pulse generator and a retriggerable ring oscillator. The digital pulse generator is used for receiving a starting step signal and loading the calibration parameter. The retriggerable ring oscillator is electrically coupled to the digital pulse generator, of which the retriggerable ring oscillator generates an oscillating signal having a period which varies as the test temperature changes. For example, the retriggerable ring oscillator is triggered by the starting step signal for generating the oscillating signal, and the digital pulse generator counts the number of oscillations of said oscillating signal according to the calibration parameter. Simultaneously, the digital pulse generator is triggered by the starting step signal to generate the mask clock signal with a mask width equal to the period of said oscillating signal multiplied by the calibration parameter.

In another embodiment, the digital pulse generator includes a programmable down counter, which is utilized to count the oscillating signal as well as reload the calibration parameter, and then to count down from the calibration parameter to zero. In yet another embodiment, the digital pulse generator includes a programmable up counter, which is utilized to count the oscillating signal as well as reload the calibration parameter, and then to count up from zero to the calibration parameter.

In this preferred embodiment, the retriggerable ring oscillator includes a delay line and an NAND gate. The delay line is used for retarding a signal from its input terminal for a delay time which varies as the test temperature changes. A first input terminal of the NAND gate is electrically coupled to the delay line, and a second input terminal thereof is electrically coupled to the digital pulse generator for receiving the mask clock signal, and an output terminal thereof is electrically coupled to the input terminal of the delay line. As the mask clock signal is set to 1, the output of the delay line is inverted by the NAND gate and then fed back to the input terminal of the delay line, thereby outputting said oscillating signal.

It is worth mentioning that the calibration parameter is a positive integer, and the number of oscillations of the oscillating signal is equal to the calibration parameter. Moreover, the calibration parameter can be stored in the temperature sensing system chip or in an off-chip non-volatile memory.

In accordance with the temperature sensing system for supporting the single-point calibration of the present invention, the calibration circuit can perform a calibration to obtain a calibration parameter for each sensor under a single calibration temperature, so that the temperature-sensitive pulse generator of each sensor can output the mask clock signal according to its specific calibration parameter and the test temperature. Then a corresponding digital output can be generated by the time-to-digital converter according to the calibrated mask width, thereby overcoming the drawback of the temperature sensor using the conventional calibration.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
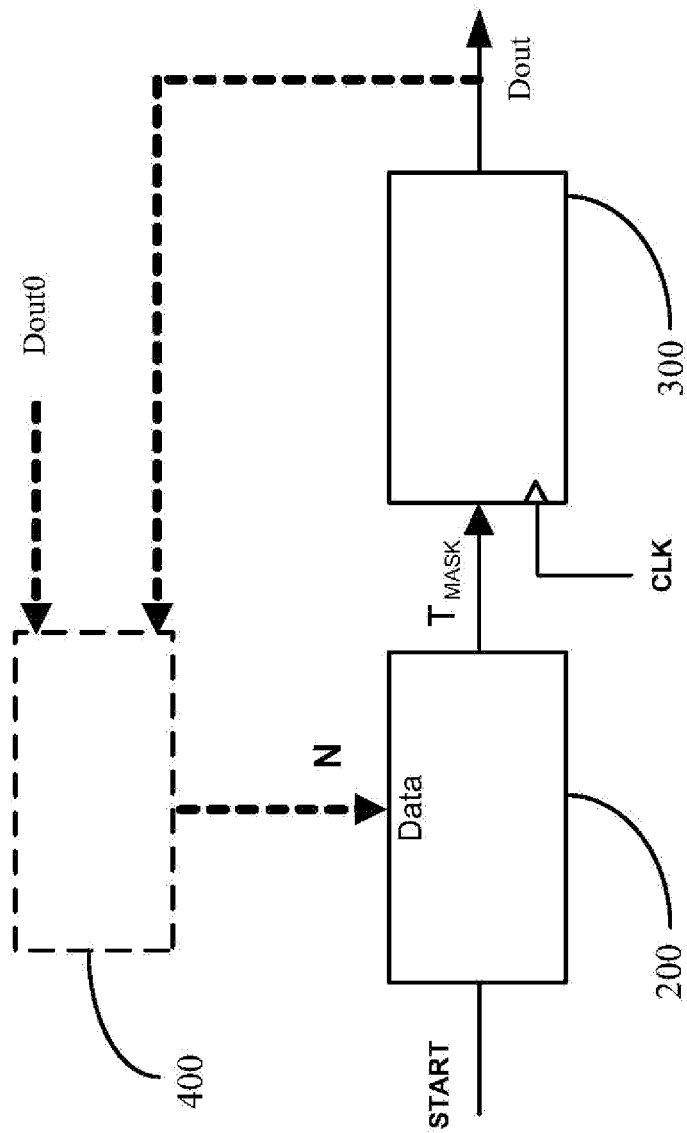
FIG. 1 is a functional block diagram illustrating a temperature sensing system according to a preferred embodiment of the present invention.

The following detailed description accompanying by drawings will explain a temperature sensing system for supporting a single-point calibration according to the present invention. Referring to FIG. 1, FIG. 1 is a functional block diagram illustrating the temperature sensing system according to the preferred embodiment of the present invention. The temperature sensing system 100 comprises a temperature-sensitive pulse generator 200, a time-to-digital converter (TDC) 300, and a calibration circuit 400. It should be noted that the calibration circuit 400 can be off-chip or in the same chip where the temperature-sensitive pulse generator 200 and the time-to-digital converter 300 are realized. Hence the calibration circuit 400 is depicted by dashed lines.

Figure 2:
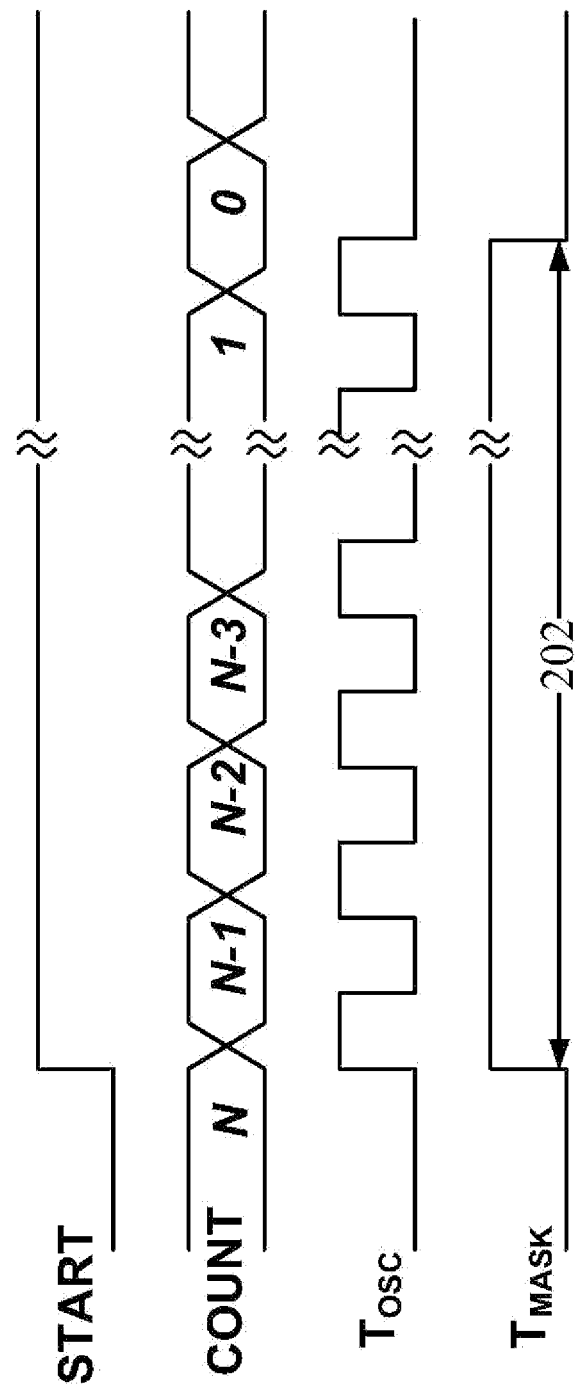
FIG. 2 is a timing chart illustrating signals generated by the temperature sensing system according to the preferred embodiment of the present invention.

Referring to FIG. 2 and FIG. 1, FIG. 2 is a timing chart illustrating signals generated by the temperature sensing system according to the preferred embodiment of the present invention. The temperature-sensitive pulse generator 200 is utilized to generate a mask clock signal $T_{MASK}$, and a mask width 202 of the mask clock signal $T_{MASK}$ varies as the test temperature changes. The temperature-sensitive pulse generator 200 adjusts the mask width 202 according to a calibration parameter N.

Referring to FIG. 1 again, the time-to-digital converter 300 is electrically coupled to the temperature-sensitive pulse generator 200 for receiving the mask clock signal $T_{MASK}$ and converting the mask width 202 into a digital output Dout. The calibration circuit 400 is electrically coupled to the temperature-sensitive pulse generator 200 and the time-to-digital converter 300. The calibration circuit 400 is used for making a comparison between the digital output Dout and a predetermined calibration value Dout0 under a single calibration temperature and to generate the calibration parameter N provided for the temperature-sensitive pulse generator 200 according to the comparison result. The following description is a detailed operation principle with respect to the temperature sensing system.

Figure 3:
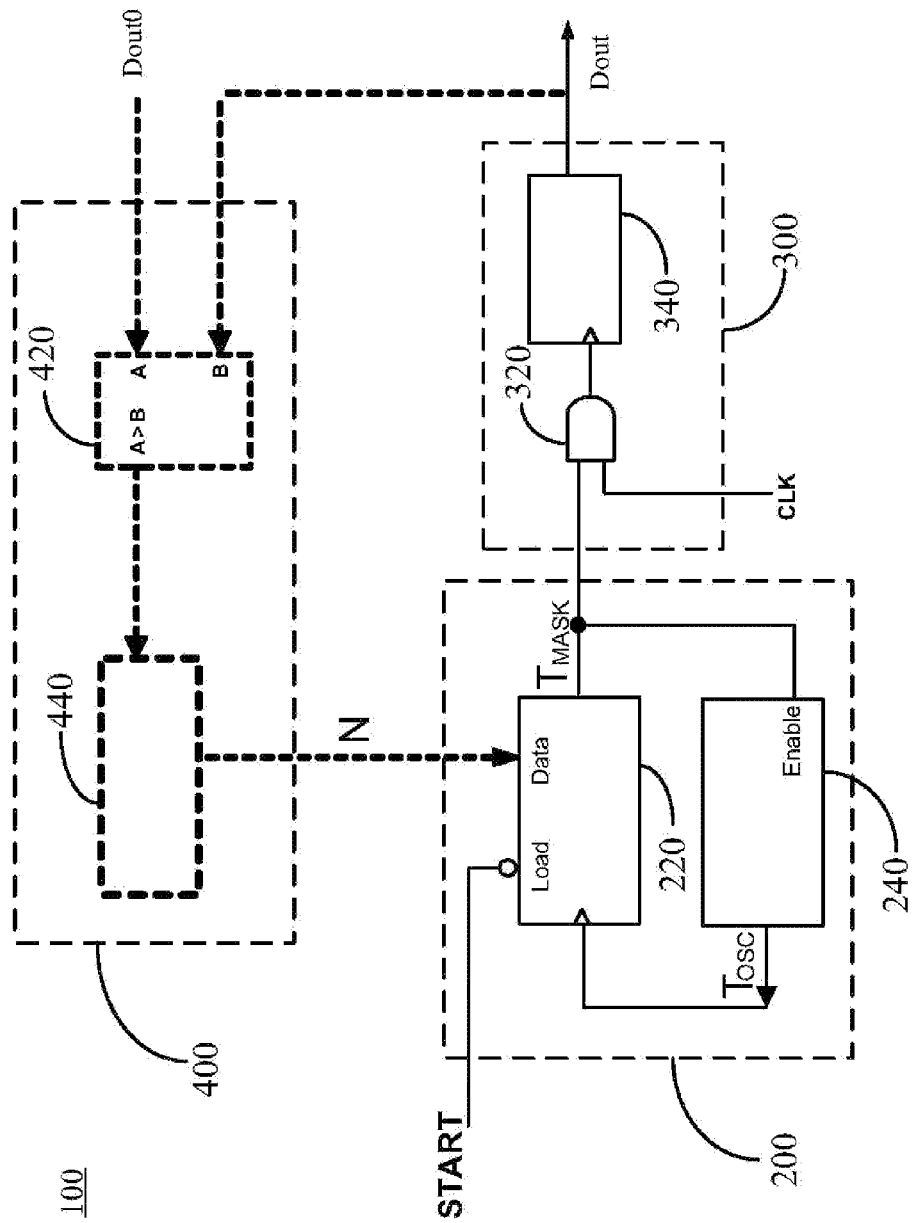
FIG. 3 is a detailed block diagram of FIG. 1.

Referring to FIG. 3, FIG. 3 is a detailed block diagram of FIG. 1. In the preferred embodiment, the temperature-sensitive pulse generator 200 comprises a digital pulse generator 220 and a retriggerable ring oscillator 240. The digital pulse generator 220 is used for receiving a starting step signal START (as shown in FIG. 2) and loading the calibration parameter N. The retriggerable ring oscillator 240, which is electrically coupled to the digital pulse generator 220, generates an oscillating signal $T_{OSC}$ (as shown in FIG. 2) having a period which varies as the test temperature changes.

Referring to FIG. 3 again, in the preferred embodiment, the time-to-digital converter 300 includes an AND gate 320 and an output counter 340. A first input terminal of the AND gate 320 is electrically coupled to the temperature-sensitive pulse generator 200 for receiving the mask clock signal $T_{MASK}$, and a second input terminal of the AND gate 320 receives a reference clock CLK. The output counter 340 counts the number of clocks that the mask width 202 lasts through the output terminal of the AND gate 320, and the output counter 340 generates the counted digital output Dout. Accordingly, the value of test temperature can be gotten in accordance with the magnitude of the digital output Dout. However, the time-to-digital converter of the present invention is not limited to be implemented in the aforementioned way.

Figure 4:
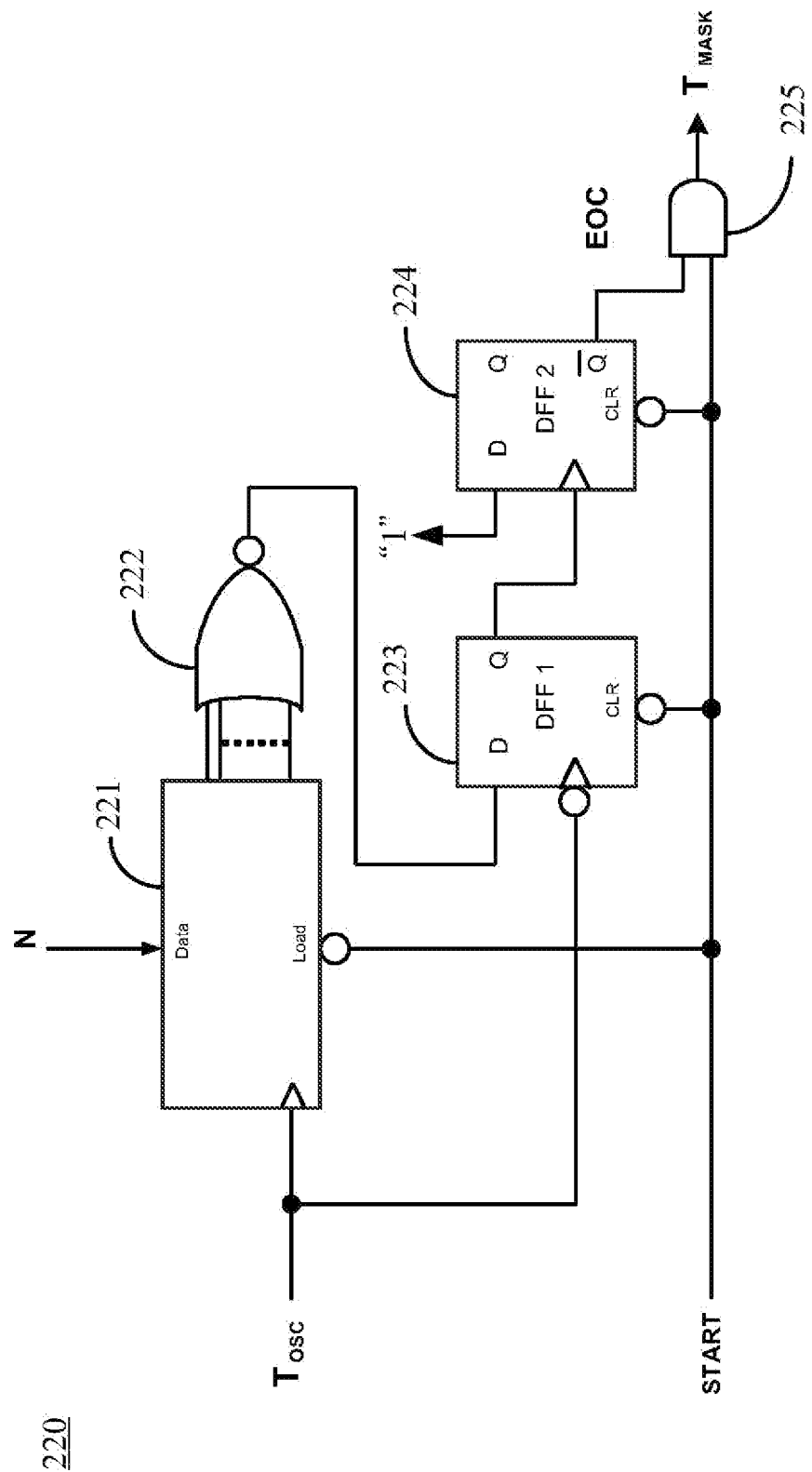
FIG. 4 is a block diagram illustrating a digital pulse generator according to the preferred embodiment.

The following description is a detailed operation principle with respect to the temperature-sensitive pulse generator 200. Referring to FIG. 4, FIG. 4 is a block diagram illustrating the digital pulse generator 220 according to the preferred embodiment. The digital pulse generator 220 has a programmable down counter 221, an NOR gate 222, a deglitcher 223, a D flip-flop 224, and an AND gate 225. The programmable down counter is utilized to receive the oscillating signal $T_{OSC}$, reload the calibration parameter N and then to count down from the calibration parameter N to 0.

Specifically, the starting step signal START is coupled to a load terminal of the programmable down counter 221. Before each conversion, the starting step signal START is set to 0, and the calibration parameter N is loaded into the programmable down counter 221. To activate a conversion, the starting step signal START is toggled to 1 and the programmable down counter 221 starts to count down. When the count reaches 0 (as shown in FIG. 2), the succeeding NOR gate 222 outputs 1 to the D terminal of the deglitcher 223, and then the output terminal of the deglitcher 223 is toggled from 0 to 1 after the next falling edge of the oscillating signal $T_{OSC}$ is reached, and then the D flip-flop 224 are triggered to reset an end-of-conversion signal (EOC) from its inverting output terminal. Meanwhile, the mask clock signal $T_{MASK}$ is also reset to 0, thereby stopping the counting of the output counter 340 in the time-to-digital converter 300.

Figure 5:
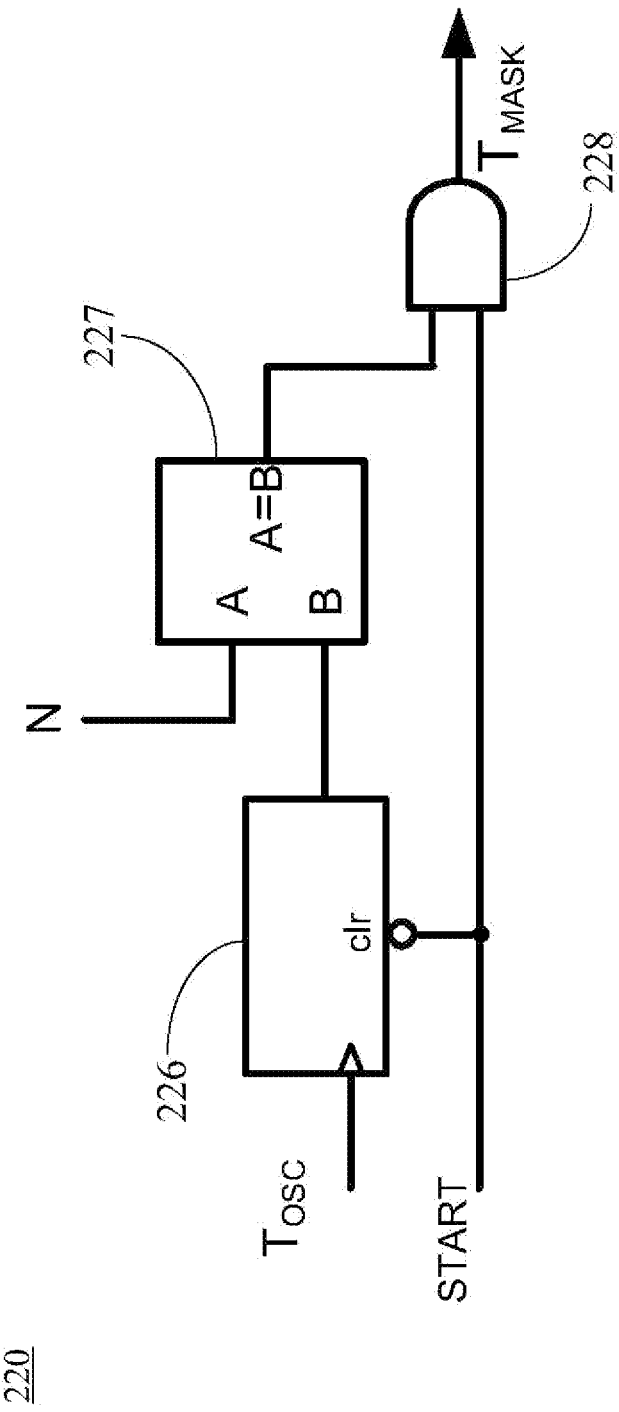
FIG. 5 is a block diagram illustrating a digital pulse generator according to another preferred embodiment.

Referring to FIG. 5, FIG. 5 is a block diagram illustrating the digital pulse generator according to another preferred embodiment. In another embodiment, the digital pulse generator 220 includes an up counter 226, a comparator 227 and an AND gate 228. The digital pulse generator is utilized to receive the oscillating signal $T_{OSC}$, and then to count up from zero to the calibration parameter N. Specifically, before each conversion, the starting step signal START is set to 0, and then the up counter is cleared (via the clr terminal). After the starting step signal START is toggled to 1, the up counter 226 starts to count up. Until the count is equal to the calibration parameter N, an output of the succeeding comparator 227 is cleared to 0, and the mask clock signal $T_{MASK}$ outputted from the AND gate 228 is reset to 0 to end the conversion.

Figure 6:
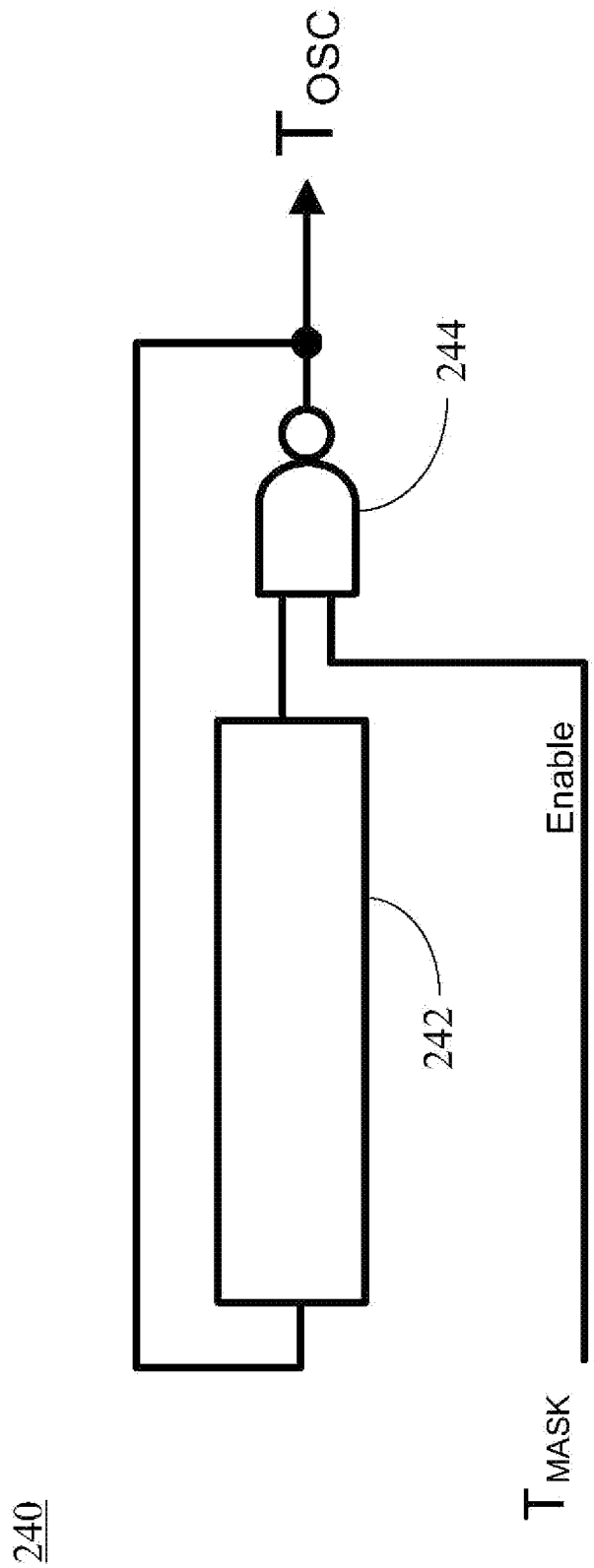
FIG. 6 is a block diagram illustrating a retriggerable ring oscillator according to the preferred embodiment.

Referring to FIG. 6, FIG. 6 is a block diagram illustrating the retriggerable ring oscillator according to the preferred embodiment. The retriggerable ring oscillator 240 comprises a delay line 242 and an NAND gate 244. The delay line 242 is used for retarding a signal from its input terminal for a delay time which varies as the test temperature changes. A first input terminal of the NAND gate 244 is electrically coupled to the delay line 242, and a second input terminal (also an enable terminal) thereof is electrically coupled to the digital pulse generator 220 for receiving the mask clock signal $T_{MASK}$, and an output terminal thereof is electrically coupled to an input terminal of the delay line 242. When the mask clock signal $T_{MASK}$ is set to 1, the output of the delay line 242 is inverted by the NAND gate 244 and then fed back to the input of the delay line 242 to generate the oscillating signal $T_{OSC}$.

Moreover, as shown in FIG. 2, after the mask clock signal $T_{MASK}$ is reset to 0, the oscillation of the retriggerable ring oscillator 240 is suppressed at the same time, so the power consumption of the temperature sensing system of the present invention can be further reduced. In short, the retriggerable ring oscillator 240 is enabled by the mask clock signal $T_{MASK}$ which is in turn set by the starting step signal START to generate the oscillating signal $T_{OSC}$, and the digital pulse generator 220 counts the number of oscillations of the oscillating signal $T_{OSC}$ to the calibration parameter N. The digital pulse generator 220 is triggered simultaneously by the starting step signal START for generating the mask clock signal $T_{MASK}$, and the mask width 202 is equal to the period of the oscillating signal $T_{OSC}$ multiplied by the calibration parameter N.

The following description is a detailed operation principle with respect to the calibration circuit. In the preferred embodiment shown in FIG. 3, the calibration circuit 400 comprises a comparator 420 and a SAR controller 440. The comparator 420 is used for comparing of the digital output Dout to the predetermined calibration value Dout0 and for generating the comparison result. The SAR controller 440 is electrically coupled to the comparator 420 and the temperature-sensitive pulse generator 200. The SAR controller 440 receives the comparison result for generating the calibration parameter N.

Specifically, under a certain calibration temperature (i.e. a single-point calibration), when the digital output Dout is larger than the predetermined calibration value Dout0, the SAR controller 440 reduces the value of the calibration parameter N and provides the calibration parameter N for the temperature-sensitive pulse generator 200 to reduce the mask width 202. Similarly, under the certain calibration temperature, when the digital output Dout is less than the predetermined calibration value Dout0, the SAR controller 440 increases the value of the calibration parameter N and provides the calibration parameter N for the temperature-sensitive pulse generator 200 to increase the mask width 202. It is worth mentioning that the calibration parameter N is a positive integer, and the number of oscillations of the oscillating signal $T_{OSC}$ is equal to the calibration parameter for each conversion.

To find the calibration parameter N, the operation of said SAR controller 440 is similar to the "binary search" in numerical methods. Taking 16-bit SAR controller 440 for example, it requires only 16 approximations for finding out the best calibration parameter N to complete the calibration of said chip (i.e. the temperature sensing system of the embodiment). In addition, the calibration parameter N can be stored in the chip of the temperature sensing system 100 or in an off-chip non-volatile memory. Similarly, the calibration circuit 400 may not be re-used after the calibration is completed, so the calibration circuit 400 can also be off-chip for cost saving.

In summary, under a single calibration temperature, the digital output of the temperature sensing system for supporting the single-point calibration of the present invention can be fixed through calibration, and the calibration parameter N can be stored in an on-chip or an off-chip component after calibration. Then the generated mask width can be converted into a digital output value according to the reference clock at any temperature under test. The structure thereof is very simple. It is not only small, low power but also capable of being fully digitized. It is worth mentioning that the measurement error of the temperature sensing system for supporting single-point calibration of the present invention is only between −0.7° C. and +0.6° C. under a measurement range 0° C. to 100° C. The power consumption of the measurement is only 1 µW or even lower, and the conversion rate is as high as 4.4 kHz. The performances thereof are much better than the ones of the conventional time-domain smart temperature sensors.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A temperature sensing system for supporting a single-point calibration, comprising:

a temperature-sensitive pulse generator for generating a mask clock signal with a mask width varying as the test temperature changes, the temperature-sensitive pulse generator adjusting the mask width according to a calibration parameter;

a time-to-digital converter electrically coupled to the temperature-sensitive pulse generator for receiving the mask clock signal directly from the temperature-sensitive pulse generator, and converting the mask width of the mask clock signal into a digital output of the temperature sensing system representing a temperature level of the test temperature; and a calibration circuit electrically coupled to the temperature-sensitive pulse generator and the time-to-digital converter, the calibration circuit used for making a comparison between the digital output of the time-to-digital converter and a predetermined calibration value under a specific calibration temperature and for generating the calibration parameter provided for the temperature-sensitive pulse generator according to the comparison result;

wherein the temperature-sensitive pulse generator uses the calibration parameter generated by the calibration circuit a single time to adjust the mask width of the mask clock signal when the specific calibration temperature is applied; and wherein the single adjustment of the mask width of the mask clock signal results in calibration of the temperature-sensitive pulse generator such that the temperature-sensitive pulse generator generates all subsequent mask clock signals in a manner reflecting such calibration.

2. The temperature sensing system of claim 1, wherein the calibration circuit comprises:
   a comparator which is used for comparing the digital output of the time-to-digital converter with the predetermined calibration value to generate a comparison result; and
   a successive approximation register (SAR) controller which is electrically coupled to the comparator and the temperature-sensitive pulse generator, and the SAR controller receives the comparison result to generate the calibration parameter.

3. The temperature sensing system of claim 2, wherein when the digital output is larger than the predetermined calibration value, the SAR controller reduces the calibration parameter, and the calibration parameter is provided to the temperature-sensitive pulse generator for reducing the mask width.

4. The temperature sensing system of claim 2, wherein when the digital output is less than the predetermined calibration value, the SAR controller increases the calibration parameter, and the calibration parameter is provided to the temperature-sensitive pulse generator for increasing the mask width.

5. The temperature sensing system of claim 1, wherein the temperature-sensitive pulse generator comprises:
   a digital pulse generator which is used for receiving a starting step signal and loading a calibration parameter; and
   a retriggerable ring oscillator which is electrically coupled to the digital pulse generator for generating an oscillating signal with a period varying as the test temperature changes.

6. The temperature sensing system of claim 5, wherein the retriggerable ring oscillator is triggered by the starting step signal for generating the oscillating signal, and the digital pulse generator counts a number of oscillations of the oscillating signal according to the calibration parameter.

7. The temperature sensing system of claim 6, wherein the digital pulse generator is triggered simultaneously by the starting step signal for generating the mask clock signal with a mask width equal to the period of the oscillating signal multiplied by the calibration parameter.

8. The temperature sensing system of claim 5, wherein the digital pulse generator comprises a programmable down counter, which is utilized to receive the oscillating signal, reload the calibration parameter and then count down from the calibration parameter to zero.

9. The temperature sensing system of claim 5, wherein the retriggerable ring oscillator comprises:
   a delay line which is used for retarding a signal from an input terminal for a delay time which varies as the test temperature changes; and
   an NAND gate, a first input terminal thereof being electrically coupled to the delay line, a second input terminal thereof being electrically coupled to the digital pulse generator for receiving the mask clock signal, and an output terminal thereof being electrically coupled to an input terminal of the delay line, wherein the output of the delay line is inverted by the NAND gate and then fed back to the input terminal of the delay line as the mask clock signal is set 1, thereby outputting the oscillating signal.

* * * * *